United States Patent Office 2,864,252
Patented Dec. 16, 1958

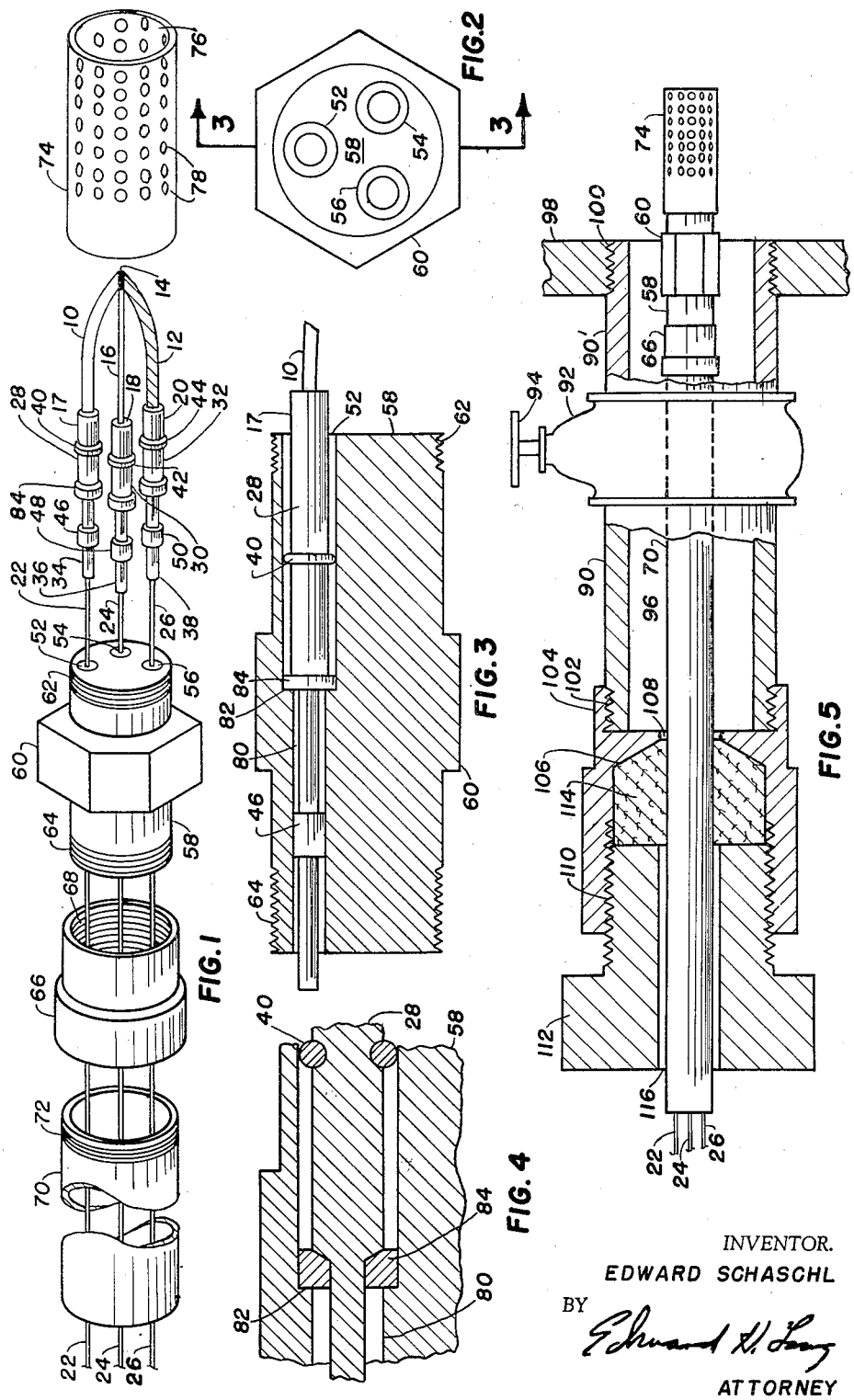

2,864,252

CORROSION TESTING PROBE

Edward Schaschl, Crystal Lake, Ill., assignor to The Pure Oil Company, Chicago, Ill., a corporation of Ohio Application December 19, 1956, Serial No. 629,365

7 Claims. (Cl. 73—86)

This invention relates to a corrosion-testing probe which is adapted to be inserted into or removed from a vessel or pipe containing the corrosive atmosphere under pressure whereby there is no necessity for releasing the pressure in the vesssel or pipe during such insertion or withdrawal. The invention lies particularly in the arrangement of pressure seals around the lugs holding the corrosion-test specimens within a base member, the arrangement of the test probe as a unit with cooperating external seals and the relationship of these parts to each other and to other parts, as will be described.

Previous designs of corrosion-test probes have necessitated relieving the pressure in the vessel or pipe in which the probe is to be installed before the probe is introduced or withdrawn. This is frequently impractical or impossible when it is desired to conduct a corrosion study on a process or pipeline, or other confined space that normally operates under pressure, where such vessels or pipes are designated for continuous and uninterrupted service over long periods of time. To shut down a large refinery unit or a pipeline supply or other process unit simply for the purpose of installing or removing a corrosion test probe is not economically feasible. Test probes of this type must be of rugged construction yet at the same time be responsive to a wide range of corrosive conditions both as to the extremes in rates of corrosion encountered and as to the variations in temperature and pressure that may be present during the test period. The correct sealing of a plurality of electrical leads in spaced, insulated relationship in a manner to withstand high pressure and temperature conditions, and variations thereof, while at the same time providing for proper exposure of the test specimens to the corrosive atmosphere, presents a unique problem. Also, to prepare a unit holder for the test specimens which can be easily inserted into a pressurized zone without danger to the operator or damage to the equipment is another problem solved by this invention.

Direct observation of the influence of corrosion under actual service conditions whereby advantage is taken of the heterogeneity of the corrosive environment is one of the most practical methods of corrosion measurement. Metallic test specimens may be simply suspended on a hanger or by means of a multi-unit support for a number of test specimens in insulated relationship to exclude galvanic contacts. But such methods do not provide means for performing corrosion tests in inaccessible places or in pressurized environments, and require tedious weighing and re-weighing of the test specimens to determine the extent and rate of corrosion. Furthermore, the results found from weight-loss methods are subject to errors and a large number of specimens are necessary to determine a proper time-corrosion curve.

Accordingly, this invention takes advantage of the methods that have been devised which make use of the correlation between change in electrical conductivity and change in cross-sectional area to determine the rate of corrosion of various materials of construction through the use of corrosion-test probes connected to electrical resistance-change meters. These instruments, known and widely used in the art, employ resistance bridges and function like analogue computers to indicate quantitatively the changes in physical characteristics which cannot be conveniently measured by other methods. There are several recent modifications of this principle. One such modification is described in a co-pending application entitled, "Apparatus for Determining the Influence of Corrosion on Metallic Materials of Construction," bearing Serial Number 528,032, filed August 12, 1955, by G. A. Marsh and the present inventor. Application Serial Number 528,032 describes means for compensating for temperature changes wherein one test specimen is mounted in exposed condition to the corrosive atmosphere and another test specimen is insulated or protected from the corrosive atmosphere by means of a suitable protective coating placed thereon. The coupons or test specimens are connected in a circuit so as to comprise one-half of a typical resistance bridge. Suitable electrical connections are made with the other half of the bridge, which is placed outside the corrosive environment along with the power supply to the bridge, and an appropriate electrical meter, such as a galvanometer, functions as a null detector. Loss of metal on the unprotected specimen induces small increases in resistance in the circuit which are correlated with metal loss by appropriate formulae described in the application.

In another co-pending application entitled, "Electronic Resistance-Change Meter," Serial Number 528,061, filed August 12, 1955, by Lynn E. Ellison, now Patent No. 2,830,265, there is described an electronic apparatus for conveniently detecting and measuring changes in resistance which provides for direct reading of the rate of corrosion. The corrosion test probe of the present invention may be used in conjunction with the apparatus described in the foregoing applications. In still another co-pending application by the present inventor entitled, "Improved Corrosion Test Probes for Use With Corosion Testing Apparatus," filed March 1, 1956, and bearing Serial Number 568,906, there are described corrosion test probes of increased rigidity, durability and strength. These probes comprise a non-conducting specimen holder which may be in the form of a ceramic core having test specimens attached to the surface thereof by electrolytic deposition or painted circuit methods. The corrosion test probe of this invention is in part an improvement over the test probes previously proposed in that it is adapted to be used both under conditions of high pressure and temperature and also adapted to be connected and disconnected from the corrosive environment without the necessity of relieving the pressure conditions therein.

It becomes therefore a primary object of this invention to provide a corrosion-test probe to be used with an electronic resistance-measuring apparatus adapted to determine the corrosivity of environments under conditions of relatively high temperature and high pressure.

Another object of this invention is to provide a new form of corrosion-test probe having a simplified pressure seal both for the test probe holder and the entire assembly.

Another object of the invention is to provide a corrosion-test probe housing and associated parts which allow the use of leads or conductors for the associated test specimens which are large enough so as to have a negligible resistance.

Still another object of the invention is to provide a corrosion-test probe wherein the overall dimensions thereof are small enough to be used with the ordinary valves and conduits which are used in processing apparatus.

These and other objects of the invention will become apparent or be described as the invention is set forth.

The invention is best described by reference to the attached drawings in which:

Figure 1 is a exploded isometric view of one form of test probe showing the relationship of parts which comprise the test probe assembly.

Figure 2 is an end view of the base member used to house the lugs which hold the corrosion test specimens as shown in Figure 1.

Figure 3 is a partial cross-sectional view of the base member taken along lines 3—3 of Figure 2.

Figure 4 is an enlarged, fragmentary, cross-sectional view of the sealing arrangement shown in Figure 3.

Figure 5 is a partial cross-sectional view showing the means for inserting, holding and removing the assembled corrosion-test probe into the wall of a process vessel or pipe containing the corrosive atmosphere to be tested.

Referring to the drawings, particularly Figure 1, 10 represents the exposed test specimen or strip and 12 the protected test specimen. Specimens 10 and 12 are joined at common point or juncture 14 from which center lead or tap 16 extends. The test specimens and center tap are each held by means of lugs as indicated at 17, 18 and 20 and are each connected to leads 22, 24 and 26, respectively, which run through the entire assembly. The test specimens, center tap and leads may be soldered or welded to the corresponding ends of the lugs. Lugs 17, 18 and 20 are identical, each comprising primary cylindrical sections 28, 30 and 32 and smaller concentric cylindrical sections 34, 36, and 38. Nos. 40, 42 and 44 represent annular or O rings on the outside of primary sections 28, 30 and 32. Spacers 46, 48 and 50 are located on smaller sections 34, 36 and 38.

Lugs 17, 18 and 20 fit within apertures 52, 54 and 60 and externally threaded ends 62 and 64. The apertures 52, 54 and 56 extend through the length of base 58. The lugs are held therein by use of a cement (not shown) such as an epoxy resin or one of the "Sauereisen" cements. Coupling 66 is tubular and has internal threads 68 which engage threads 64 of base 58 and also has internal threads at the other end to which tubular extension 70 attaches by means of threads 72. Guard member 74 is internally threaded to engage threads 62 of base 58 and contains test specimens 10 and 12, and common tap 16 within its inner opening 76. Holes 78 through the wall of guard 74, communicating with opening 76, allow ingress and egress of the corrosive atmosphere to the test specimens.

Figure 2 shows one end of base 58 and the spaced relationship of apertures 52, 54 and 56. Hexagonal section 60 is, of course, for the purpose of engaging a wrench thereto to facilitate assembly of the device.

In Figure 3, wherein the positioning of plug 17 within aperture 52 of base 58 is shown, the sealing action of O ring 40 against the inner wall of aperture 52 is made clear. Aperture 52 has restricted portion 80 terminating in shoulder 82 which, in cooperation with the end of primary cylindrical section 28 of lug 17 forms a pressure seal with gasket 84. Cement may be applied between spacer 46 and gasket 84 in the annular space between section 34 and the wall of restricted portion 80. This arrangement prevents "blowout" of the lugs 17, 18 and 20 due to pressure forcing against the exposed body of these lugs and forms an effective pressure seal within base 58. Details of this construction are shown in Figure 4. Shoulder 82 may be angular instead of square as shown.

In Figure 5 the parts shown in Figures 1, 2 and 3 or 4 are assembled and mounted in and through pipe 90 and valve 92 operated by wheel 94. Valve 92 may be any type of valve having an opening large enough to receive the assembled device and adapted to close passageway 96 of pipe 90. Pipe 90 is attached to vessel wall 98 as by means of threads 100 to provide an opening therethrough for entry of the test specimens, housed within guard 74, into the corrosive atmosphere confined by wall 98.

The other end of pipe or tubular housing 90 is provided with threads 102 to engage packing gland 104 having tapered inner shoulder 106, opening 108 and internal threads 110 at the enlarged end thereof. Packing nut 112 engages threads 110 and forces against gasket 114 to form a seal around extension 70. Packing nut 112 has opening 116 to permit the entry of extension 70.

The assembly as shown in Figure 5 is mounted and ready for use when leads 22, 24 and 26 are connected to a measuring instrument (not shown). In practice, before the test probe is inserted, valve 92 will be closed. When the probe is to be installed, it is inserted through packing gland 104 with gasket 114 in place until guard 74 reaches the closed valve 92. Packing nut 112 is drawn up until a seal is provided around extension 70. This seal is sufficient to prevent the escape of corrosive atmosphere during any movement of extension 70. With the seal by gasket 114 established, valve 92 is opened and the entire assembly is further advanced therethrough until in the position shown in Figure 5. Valve 92 may then be partially closed around extension 70 to act as a support and packing nut 112 is tightened to provide a maximum sealing pressure.

At the completion of the use of the instrument, valve 92, which may be an ordinary gate valve is opened fully, the device is withdrawn until guard 74 clears the valve 92 and valve 92 is closed. Packing nut 112 is then removed and the device withdrawn from pipe 90.

The various component parts of the test probe as described may be made of any materials of construction and are preferably made of metal or metal alloys that are resistant to the corrosive action of the environment in which the unit is used. The gaskets and O rings used in the test probe, which are subjected to elevated temperatures, should be constructed of such insulating and sealing material available that is resistant to corrosion and has good electrical properties. Suitable materials include Teflon, paper and fabric laminates such as the phenolic and epoxy resin, laminates where the maximum operating temperature of the test probe does not exceed about 250° F. These materials, described in "Materials and Methods," vol. 42, No. 1, July 1955, exhibit good metal bonding strength, flexing strength, and arc resistance, and are of low cost. The maximum temperature at which these materials may be joined is about 400° to 450° F. with a time of heating not more than about 5 seconds. The maximum operating temperatures for glass fiber laminates are; melamine, 260° F.; silicone, 300° F.; polystyrene, 170° F.; polyester, 250° F.; Teflon 300° F.+; and epoxy 250° F.+, but the binding temperatures are higher and the dimension stability is improved over paper and fabric laminates. Phenolic nylon fabric laminates would have only limited application, since the maximum operating temperature during fabrication or use is only about 165° F. Ceramic insulators such as titanite, steatite, glass bonded mica, and glass bonded synthetic mica withstand high temperatures and high frequencies. The latter-named mica inorganic materials can be used or fabricated at temperatures as high as 650° to 750° F.

Test element 12 is coated or protected by a thin layer of a protective coating having good insulating and corrosion resisting properties. Suitable examples of such materials include such proprietary compounds as Tygon paint (American Chemical Paint Co., Ambler, Pa.), Armstrong A–2 adhesive; Carbolene Phenoline 300; Scotchcast Resin-MMM; Sauereisen cement, which is desirable for high temperature applications; fluorinated ethylene polymers such as Kel-F, Teflon, polyethylene (these would have to be flame-sprayed); or any corrosion - resistant, relatively non - conducting coating, These and other plastic materials of construction are described in detail in "Modern Plastics Encyclopedia," vol.

33, No. 1A, 1955, published by Plastics Catalogue Corp. of Bristol, Connecticut. The Plastics Properties Chart accompanying this publication gives the physical, chemical, electrical, molding and other properties of numerous plastics, and their trade names, that may be used.

The coating should be of sufficient thickness to provide complete protection to the coated resistance element both during the test life of the corrosion testing unit or probe and during handling or storage. The coating may be applied by spraying, dipping, brushing, etc., amenable to the particular coating chosen.

The test specimens 10 and 12 have substantially the same resisitivty, which means they will have substantially the same chemical composition. This is necessary in order that the bridge measuring circuit, which is connected to the test probe by means of leads 22, 24 and 26, may be made to function accurately without tedious calibration. However, it is unnecessary that the configuration or total resistance of the protected and unprotected test specimens be identical. Because the corrosion-measuring process with which the test probe of this invention is used utilizes a comparison method for determining the change in resistance of the unprotected test specimen or resistance element when exposed to corrosive conditions, the bridge circuit in which the test probe is installed during use is initially balanced by adjusting the ratio of the resistance elements.

The test specimens may be any shape, that is ribbon-like or in a shape of rods. The test specimens may be fabricated from one piece of the material of construction under consideration and the common junction 14 formed by welding common lead 16 to a mid-point thereof. Before use or when new, the test specimens have substantially the same electrical resistivity and chemical composition. Advantages accrue in constructing the test specimens or elements from materials having the same resistance values. However, suitable unsymmetrical corrosion testing elements can be fashioned in accordance with this invention in which the resistances of these elements are not identical, provided, for the sake of consistency, a material of construction is employed which is substantially uniform in composition and resistivity. The ratio of the resistance of the unprotected test specimen to the resistance of the protected test specimen, expressed as $$\frac{R \text{ unprotected}}{R \text{ protected}}$$

may vary from values of about 0.1 to 10. When a corrosion test element combination is fabricated from test specimens having different resistances within the above ratios, corresponding changes in the values of the resistances of the other branches of the bridge circuit will have to be made. Although, theoretically, the above ratios of resistances could vary over wide limits, as a practical matter there are mechanical and electrical factors which have to be taken into consideration in the design of a suitable corrosion testing unit or probe. Lead resistance, for example, will be appreciable if a small corrosion testing probe is used in which the resistance of one element is only about a tenth or less of the resistance of the other element. This factor is not pronounced in the case of large, unsymmetrical test elements in which the resistance of even the smaller one is large compared with the lead resistance. Lead resistance can be substantially eliminated by the manner of interconnecting the corrosion testing unit with the bridge circuit. Mechanical considerations include making the test probe unit large enough for easy assembly and attachment of the lead wires, and to offset an unbalance in temperature compensation.

From this description it is seen that the invention is necessarily confined to the use of test specimens having the property of conducting electricity and showing a change in resistance proportional to changes in cross-sectional area due to corrosion. The materials of construction that meet these requirements include all metals and metal alloys such as steel, iron, bronze, brass, copper and the like. The environment to be investigated by the test elements or the completed test probes of this invention may be in any physical state or may exist as a mixture of substances in different physical states. The corrosive environment may be gaseous, vaporous, solid, or semi-solid, or a mixture of these forms of matter. Examples include corrosive gases, such as the halogens, acid or base solutions, flue gases, and mixtures of gases or carrier liquids containing a high content of solids, such as catalyst particles. These environments may be considered to be corrosive because of their chemical effects and erosive because of their mechanical effects on the metal surfaces which result in disintegration thereof or loss of portions of the exposed test specimen. An example of a corrosive liquid environment would be an acid solution or an ammonia-ammonium nitrate fertilizer solution.

Since the test probe of this invention is designed for use at relatively high pressures and temperatures, care should be exercised in the selection of the materials of construction for the base member and associate parts. The thread and gasket-sealing surfaces should be carefully prepared so as to be without roughness or flaws. Thread-sealing compounds may be used on the threaded surfaces to insure against leaks.

What is claimed is:

1. A corrosion-test probe mounting comprising, in combination, a base member adapted to be attached through the wall of a vessel containing a corrosive atmosphere, apertures extending longitudinally through said base member, each of said apertures having a circumferential shoulder therein, that portion of the apertures on the pressure side of the base member being larger than the remainder of each aperture, lug members mounted within each of said apertures in insulated relationship therewith, said lug members having a shoulder portion, an enlarged portion and a constricted portion corresponding to said apertures, circumferential insulating means between the outer wall of said lug members and the inner wall of said apertures, circumferential insulating members between the shoulder portion of each of said lug members and the corresponding shoulder of said apertures, and means for maintaining said corrosion-test probe mounting within a corrosive atmosphere.

2. A corrosion-test probe mounting in accordance with claim 1 in which said corresponding shoulder portions have parallel surfaces normal to the longitudinal axis of said apertures and said lug members.

3. A corrosion-test probe mounting in accordance with claim 1 in which said corresponding shouder portions have parallel surfaces oblique to the longitudinal axis of said apertures and said lug members.

4. A corrosion-test probe mounting in accordance with claim 1 in which the shoulder portions of said aperture are normal to the longitudinal axis of said apertures and the shoulder portions of said lug members are oblique to the longitudinal axis of said lug members.

5. A corrosion-test probe mounting in accordance with claim 1 having test specimens attached to two of said lug members and a common lead attached to a third lug member, said points of attachment being at the enlarged pressure side ends of said lug members, said test specimens and said common lead being joined at a common juncture.

6. A corrosion-test probe in accordance with claim 5 having a perforated tubular guard member surrounding and spaced from said test specimens and said common lead, said guard member being supported by said base member, electrical leads attaching to the constricted ends of said lug members.

7. A corrosion-test probe in accordance with claim 6 in which a tubular extension and support member encompasses said leads and is attached to said base member.

References Cited in the file of this patent
UNITED STATES PATENTS

| | | |
|---|---|---|
| 1,769,463 | Rice | July 1, 1930 |
| 2,616,949 | Cade | Nov. 4, 1952 |
| 2,640,902 | Aske et al. | June 2, 1953 |

OTHER REFERENCES

The Oil and Gas Journal, November 21, 1955, pages 135–138, AIP Section.